(12) United States Patent
Fujita (10) Patent No.: US 7,559,566 B2
(45) Date of Patent: Jul. 14, 2009

(54) SWING ARM SUSPENSION

(75) Inventor: Masayuki Fujita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 536 days.

(21) Appl. No.: 10/933,395

(22) Filed: Sep. 3, 2004

(65) Prior Publication Data

US 2005/0087947 A1    Apr. 28, 2005

(30) Foreign Application Priority Data

Sep. 9, 2003    (JP)    ............................. 2003-317304

(51) Int. Cl.
*B62K 1/00*    (2006.01)
*B62K 3/00*    (2006.01)
*B62K 5/00*    (2006.01)
*B62K 15/00*   (2006.01)

(52) U.S. Cl. ....................... 280/284; 280/285; 280/286; 180/218

(58) Field of Classification Search .......... 280/124.128, 280/284, 285, 286, 288; 180/218, 227, 219
See application file for complete search history.

(56) References Cited

U.S. PATENT DOCUMENTS

| | | | |
|---|---|---|---|
| 5,592,999 A * | 1/1997 | Matsuura et al. ............ | 180/227 |
| 6,024,185 A * | 2/2000 | Okada et al. ................. | 180/227 |
| 6,446,996 B1 * | 9/2002 | Horii ......................... | 280/281.1 |
| 6,502,658 B1 * | 1/2003 | Nagashii ..................... | 180/219 |
| 6,691,814 B2 * | 2/2004 | Toyoda ........................ | 180/227 |
| 6,722,461 B2 * | 4/2004 | Gogo .......................... | 180/227 |
| 7,097,259 B2 * | 8/2006 | Toyoda ...................... | 301/110.5 |
| 2004/0222693 A1 * | 11/2004 | Toyoda ...................... | 301/110.5 |

FOREIGN PATENT DOCUMENTS

| | | |
|---|---|---|
| EP | 1 247 730 A2 | 10/2002 |
| EP | 1 273 509 A2 | 1/2003 |
| JP | 2002-68066 A | 3/2002 |
| JP | 2003-11875 A | 1/2003 |

\* cited by examiner

*Primary Examiner*—Toan C To
(74) *Attorney, Agent, or Firm*—Birch, Stewart, Kolasch & Birch, LLP (57) ABSTRACT

A swing arm suspension for reducing the number of parts to thereby reduce the number of man-hours for assembly, the weight and the cost. The swing arm suspension includes a pivot plate provided with a pivot shaft, a swing arm having a rear end portion supporting a rear wheel that is swingably mounted at a front end portion to the pivot shaft and a shock absorber that is mounted at an upper end portion to the swing arm and connected at a lower end portion through a link mechanism to a portion of the pivot plate at a lower level than the pivot shaft. An exposing portion is provided for exposing a shock absorber arrangement space to an upper space above the swing arm. At least one of a subtank and an adjuster as functional components of the shock absorber is located in the exposing portion.

20 Claims, 6 Drawing Sheets

SWING ARM SUSPENSION

CROSS-REFERENCE TO RELATED APPLICATIONS

The present application is related to Japanese Patent Application No. 2003-317304 filed on Sep. 9, 2003 the entire contents of which are hereby incorporated by reference.

BACKGROUND OF THE INVENTION

1. Field of the Invention

The present invention relates to a swing arm suspension for use in a vehicle such as a motorcycle.

2. Description of Background Art

A recent swing arm suspension for a vehicle such as a motorcycle is available wherein a vehicle body structure is provided with a pivot shaft with a swing arm having a rear end portion supporting a wheel that is swingably mounted at a front end portion to the pivot shaft. A shock absorber is mounted at an upper end portion to the swing arm and is connected at a lower end portion through a link mechanism to a portion of the vehicle body lower in level than the pivot shaft. See, for example, Japanese Patent Laid-open No. 2002-68066 and Japanese Patent Laid-open No. 2003-11875. An upper mount for mounting the upper end portion of the shock absorber to the swing arm is a separate member to be fixed to the swing arm. That is, the opposite side portions of the upper mount are fastened to a pair of right and left arm portions of the swing arm by means of bolts or the like.

In the swing arm suspension mentioned above, the upper mount is mounted so as to close an upper opening of the space for the arrangement of the shock absorber inside the swing arm. Accordingly, a subtank or an adjuster as a functional component of the shock absorber is a separate member to be connected to the shock absorber, so that these components are connected through hoses or the like to the shock absorber and fixed to the swing arm at a position behind the upper mount. See, Japanese Patent Laid-open No. 2003-11875. However, it is desirable to improve this configuration, so as to reduce the number of parts of the swing arm suspension.

SUMMARY AND OBJECTS OF THE INVENTION

It is accordingly an object of the present invention to provide a swing arm suspension which can reduce the number of parts to thereby reduce the number of man-hours for assembly, the weight and the cost.

In accordance with the present invention, there is provided a swing arm suspension 10, having such a structure that a pivot plate 8 is provided with a pivot shaft 11 with a swing arm 13 having a rear end portion supporting a rear wheel 12 that is swingably mounted at a front end portion to the pivot shaft. A shock absorber 14 is mounted at an upper end portion to the swing arm and is connected at a lower end portion through a link mechanism 15 to a portion of the vehicle body lower in level than the pivot shaft. An upper portion of the swing arm is provided with an exposing portion 80A for exposing a space for the arrangement of the shock absorber, for example, a space H to an upper space above the swing arm. At least one of a subtank 57 and an adjuster 56 is provided as functional components of the shock absorber and is located in the exposing portion.

With this arrangement, no shock load is input to a portion of the vehicle body above the pivot shaft. Furthermore, a battery and other components can be collectively arranged, so that the cornering performance of the vehicle can be improved. Further, the subtank or the adjuster as the functional component located in the exposing portion can be formed integrally with the shock absorber. In this case, the number of parts can be reduced as compared with the case wherein these functional components are separate components to be fixed to the shock absorber. Further, any existing shock absorber having an upper portion from which a functional component projects can be used. In this case, the functional component of the shock absorber can project into the upper space above the swing arm, thereby effectively utilizing the space in the vehicle body.

In accordance with the present invention, an upper mount (e.g., upper mount 40 in the preferred embodiment) for mounting the upper end portion of the shock absorber is formed integrally with the upper portion of the swing arm, and the exposing portion is formed behind the upper mount.

Accordingly, as compared with the case where the upper mount is a separate member to be fixed to the swing arm, there is no need for using any fastening parts such as bolts for fastening the upper mount to the swing arm and for providing any fastening portions. As a result, the number of parts can be reduced. Further, the space behind the upper mount can be effectively utilized as the exposing portion.

In accordance with the present invention, there is provided a swing arm suspension 10 having such a structure that a pivot plate 8 is provided with a pivot shaft 11 with a swing arm 13 having a rear end portion supporting a rear wheel 12 that is swingably mounted at a front end portion to the pivot shaft. A shock absorber 14 is mounted at an upper end portion to the swing arm and is connected at a lower end portion through a link mechanism 15 to a portion of the vehicle body that is lower in level as compared to the pivot shaft. An upper portion of the shock absorber is integrally formed with at least one of a subtank 57 and an adjuster 56 as functional components of the shock absorber.

With this arrangement, the cornering performance of the vehicle can be improved and the number of parts of the swing arm suspension can be reduced.

According to the present invention, the cornering performance of the vehicle can be improved and any mounting members for the subtank and the adjuster can be eliminated to thereby reduce the number of parts. Accordingly, the swing arm suspension can be easily assembled and the weight and cost can also be reduced. Further, any existing shock absorber can be used and the space in the vehicle body can be effectively utilized to thereby assist with the body design.

According to the present invention, any mounting members for the upper mount can be eliminated to thereby reduce the number of parts. Accordingly, the swing arm suspension can be easily assembled and the weight and cost can also be reduced. Further, the space behind the upper mount can be effectively utilized as the exposing portion.

According to the present invention, the number of parts can be reduced. Accordingly, the swing arm suspension can be easily assembled and the weight and cost can also be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will now be described with reference to the drawings. In the following description, the terms related to orientation or direction such as front, rear, right, and left are the same as those in the vehicle.

Figure 1:
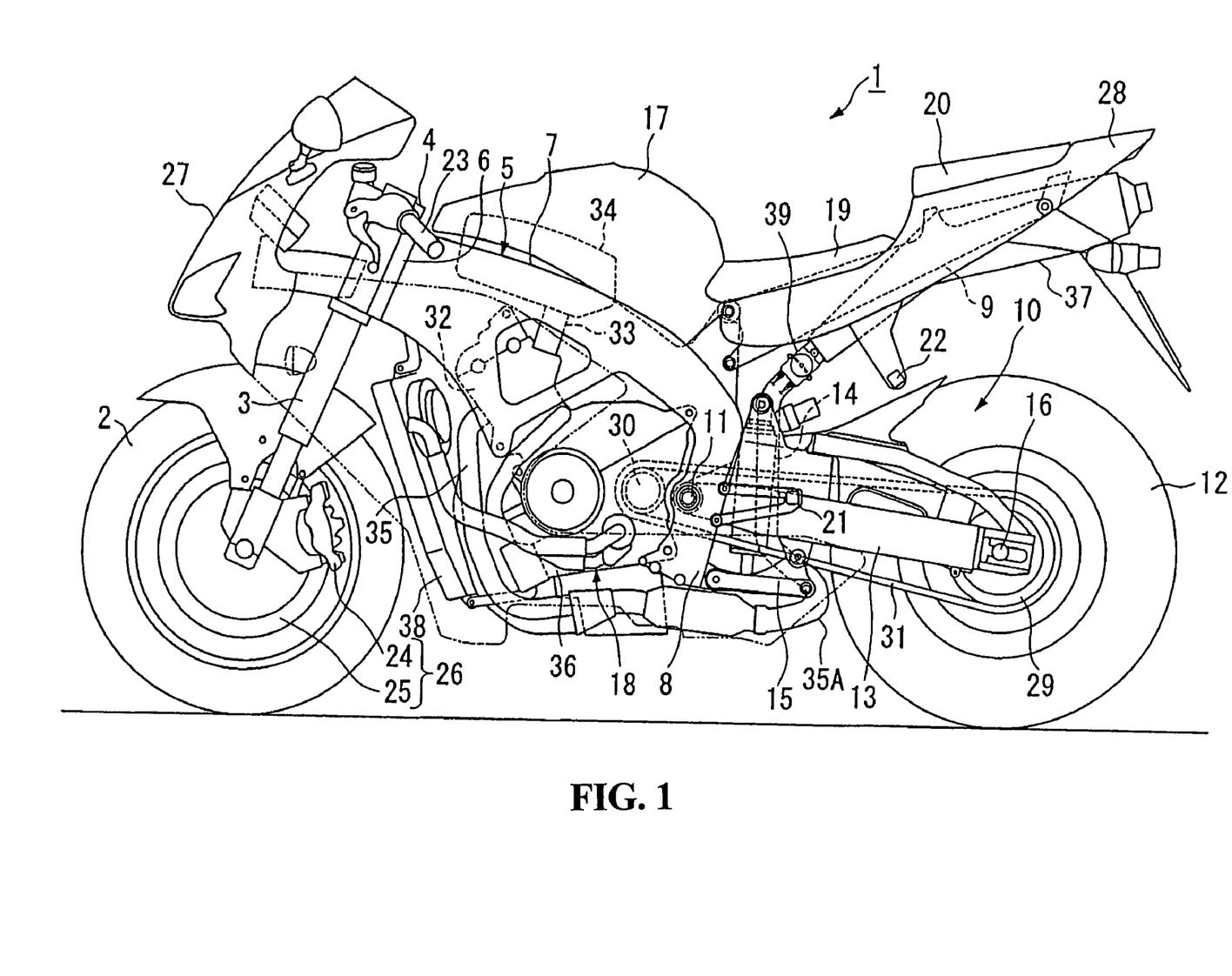
FIG. 1 is a left side view of a motorcycle according to a preferred embodiment of the present invention.

As shown in FIG. 1, a motorcycle 1 is provided as an example of the vehicle. The motorcycle 1 has a front wheel 2 supported through a front axle to a front fork 3. The front fork 3 is steerably supported through a steering stem 4 to a head pipe 6 provided at the front end of a body frame 5. The body frame 5 includes a main frame 7 extending rearwardly from the head pipe 6 so as to be inclined downwardly. The rear end of the main frame 7 is bent downwardly and joined continuously to a pivot plate 8. The body frame 5 further includes a seat frame 9 extending rearwardly from a rear portion of the main frame 7 so as to be inclined upwardly. The front end of the seat frame 9 is connected to the rear portion of the main frame 7.

A swing arm suspension 10 according to the present invention is provided at a rear portion of the vehicle body of the motorcycle 1. The swing arm suspension 10 has a structure such that the pivot plate 8 (vehicle body) is provided with a pivot shaft 11 with a swing arm 13 having a rear end portion supporting a rear wheel 12 that is swingably mounted at a front end portion to the pivot shaft 11 and a shock absorber 14 mounted at an upper end portion to the swing arm 13 and connected at a lower end portion through a link mechanism 15 to a portion of the pivot plate 8 lower in level than the pivot shaft 11. The pivot shaft 11 extends parallel to the lateral direction of the vehicle like an axle 16 for the rear wheel 12. The axle will be hereinafter referred to as a rear axle.

A fuel tank 17 is mounted on the upper side of the main frame 7, and a water-cooled, in-line four-cylinder engine 18 is mounted on the lower side of the main frame 7. A rider seat 19 and a pillion seat 20 for a passenger are arranged in tandem on the rear side of the fuel tank 17. A rider step or footrest 21 is mounted on a rear portion of the pivot plate 8 and a pillion step or footrest 22 is mounted on a lower portion of the seat frame 9.

A steering handle 23 is mounted at an upper end portion of the front fork 3 with a brake caliper 24 being mounted at a lower end portion of the front fork 3 and a brake rotor 25 corresponding to the brake caliper 24 being mounted on the front wheel 2, thereby configuring a front brake unit 26. Although not shown, a rear brake unit having a configuration similar to that of the front brake unit 26 for the front wheel 2 is provided on the right side of the rear wheel 12.

A front portion of the vehicle body of the motorcycle 1 is covered with a front cowl 27 and the periphery of the seat frame 9 is covered with a rear cowl 28. A rear sprocket 29 is mounted on the left side of the rear wheel 12 and a drive sprocket 30 is provided on the left side of a rear portion of the engine 18. A drive chain 31 is wrapped between the rear sprocket 29 and the drive sprocket 30 to thereby transmit a drive force of the engine 18 to the rear wheel 12.

The engine 18 has a cylinder body 32 including four cylinders. A throttle body 33 corresponding to each cylinder is connected to a rear portion of the cylinder body 32. An air cleaner case 34 is located between the main frame 7 and the fuel tank 17. The air cleaner case 34 is connected to all of the throttle bodies 33. An exhaust pipe 35 corresponding to each cylinder is connected to a front portion of the cylinder body 32. A radiator 38 for cooling the engine 18 is provided on the front side of all the exhaust pipes 35. Each exhaust pipe 35 extends from the front wall portion of the cylinder body 32 so as to be curved downwardly. All the exhaust pipes 35 are joined together at a position below a crankcase 36 to provide a single exhaust pipe 35A. The exhaust pipe 35A is curved upwardly on the rear side of the pivot plate 8 and further curved rearwardly in the vicinity of the seat frame 9. The exhaust pipe 35A is connected to a silencer 37 supported to the seat frame 9. An exhaust control valve 39 is provided just downstream of a bent portion of the exhaust pipe 35A in the vicinity of the seat frame 9. The exhaust control valve 39 functions to change a flow area in the exhaust pipe 35A according to a rotational speed of the engine 18, thereby controlling exhaust pulsation in an exhaust system.

Figure 2:
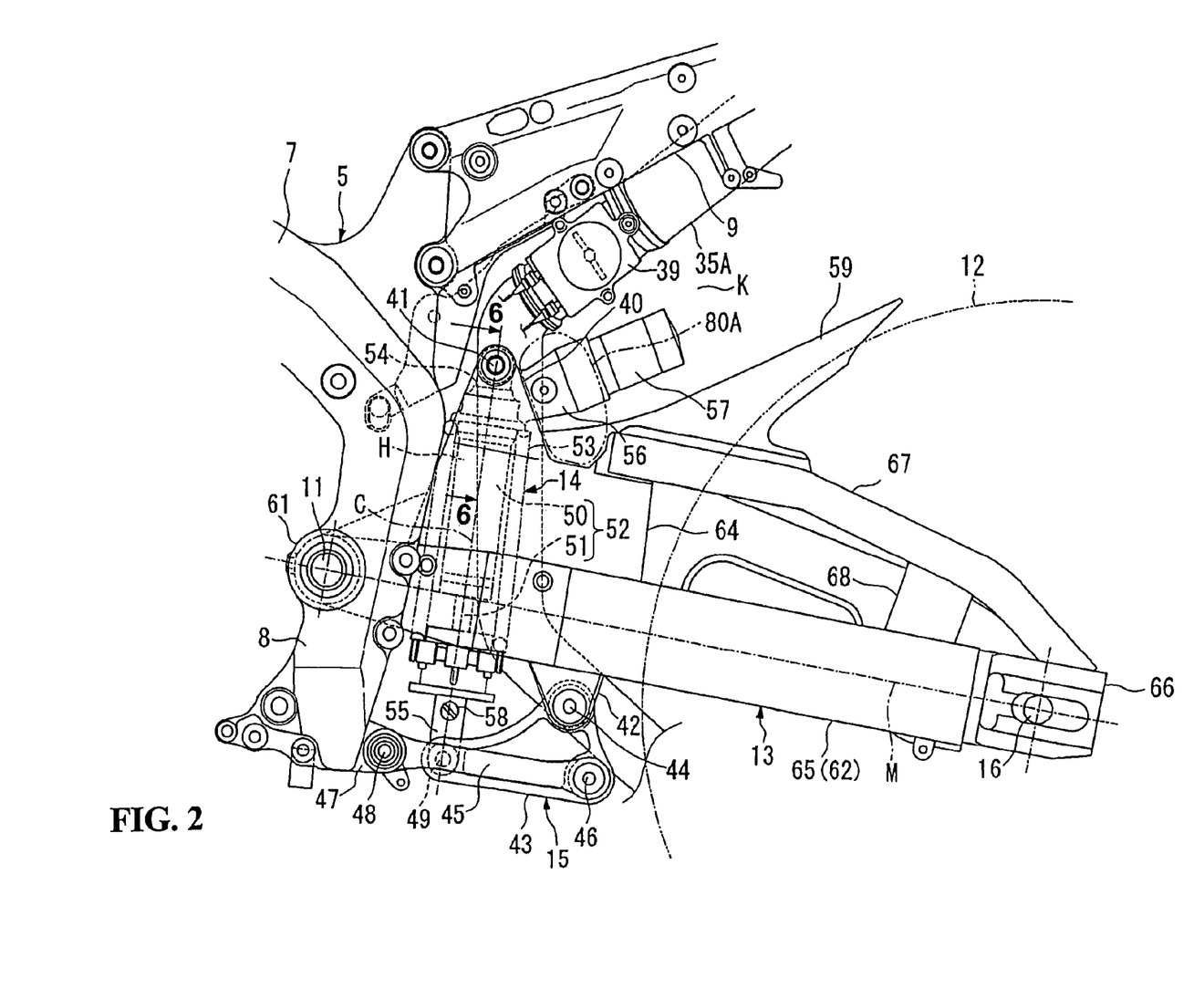
FIG. 2 is a left side view of a swing arm suspension provided in the motorcycle shown in FIG. 1.

As shown in FIG. 2, an upper mount 40 is provided on an upper portion of the swing arm 13 at a position near the pivot shaft 11. The upper end portion of the shock absorber 14 is pivotably connected through a first connecting shaft 41 to the upper mount 40. A lower bracket 42 is provided on a lower portion of the swing arm 13 at a position on the rear side of the upper mount 40 and a link arm 43 of the link mechanism 15 is pivotably connected through a second connecting shaft 44 to the lower bracket 42.

The link mechanism 15 includes the link arm 43 and a link rod 45 extending in the substantially longitudinal direction of the vehicle. The link arm 43 has a substantially triangular shape as viewed in side elevation with each vertex portion of the link arm 43 serving as a connecting portion for another component. That is, an upper end portion of the link arm 43 is connected to the lower bracket 42. Further, a rear end portion of the link rod 45 is pivotably connected through a third connecting shaft 46 to a rear end portion of the link arm 43. Further, a body-sided lower bracket 47 is provided on the rear side of a lower end portion of the pivot plate 8 and a front end portion of the link rod 45 is pivotably connected through a fourth connecting shaft 48 to the body-sided lower bracket 47. Further, a lower end portion of the shock absorber 14 is pivotably connected through a fifth connecting shaft 49 to a front end portion of the link arm 43. The connecting shafts 41, 44, 46, 48, and 49 extend parallel to the pivot shaft 11.

When the swing arm 13 swings about the pivot shaft 11 so as to move upwardly the rear axle 16, the link arm 43 connected through the link rod 45 to the vehicle body moves upwardly and pivots about the third connecting shaft 46 in a clockwise direction as viewed in FIG. 2, so that the lower end portion of the shock absorber 14 connected to the front end portion of the link arm 43 is moved upwardly. At this time, the stroke of the lower end portion of the shock absorber 14 is set larger than the upward movement of the upper end portion of the shock absorber 14 by the above swing of the swing arm 13, so that the shock absorber 14 is moved upwardly so as to decrease the distance between the upper and lower end portions of the shock absorber 14. Similarly, when the swing arm 13 swings so as to move downwardly the rear axle 16, the shock absorber 14 is moved downwardly so as to increase the distance between the upper and lower end portions of the shock absorber 14.

The shock absorber 14 has an inverted damper 52 and a spring 53. The inverted damper 52 includes a cylinder 50 arranged on the upper side and a piston rod 51 arranged on the lower side. The piston rod 51 is moved with a piston accommodated in the cylinder 50. The spring 53 is set under a predetermined initial load between a flange portion formed at an upper end portion of the cylinder 50 and a flange portion formed at a lower end portion of the piston rod 51. A connecting portion (which will be hereinafter referred to as an upper connecting portion) 54 for connection with the upper mount 40 is formed on the upper side of the cylinder 50, and a connecting portion (which will be hereinafter referred to as a lower connecting portion) 55 for connection with the link arm 43 is formed on the lower side of the piston rod 51. These upper and lower connecting portions 54 and 55 are formed at the upper and lower end portions of the shock absorber 14, respectively. The shock absorber 14 is moved so that the distance between the upper and lower connecting portions 54 and 55 is decreased or increased, whereby shock or vibration from a road surface is changed to expansion and contraction of the spring 53, and is simultaneously reduced by expansion and contraction of the damper 52 to thereby gently absorb the shock or vibration.

The upper end portion of the shock absorber 14 is mounted to the upper portion of the swing arm 13 and the lower end portion of the shock absorber 14 is mounted to the pivot plate 8 at a position lower than the pivot shaft 11. Accordingly, there is no possibility that a shock absorber load upon movement of the shock absorber 14 may be input to a portion of the vehicle body at a position higher than the pivot shaft 11. As a result, a cross pipe or the like can be removed from the body frame 5 as required in the case of mounting the shock absorber 14 to the vehicle body at a position higher than the pivot shaft 11. Accordingly, the exhaust pipe 35A including the exhaust control valve 39 and a relatively large component such as a battery (not shown) can be collectively located above the pivot shaft 11.

An adjuster 56 for adjusting an extension damping force of the shock absorber 14 is integrally provided on the rear side of the upper end portion of the cylinder 50. The adjuster 56 projects from the rear side of the upper end portion of the cylinder 50 so as to be inclined upwardly toward the rear end of the vehicle with respect to an axis C of the shock absorber 14 extending in its longitudinal direction. Further, a subtank 57 is integrally provided on the rear end of the adjuster 56 so as to communicate with the cylinder 50. Hydraulic oil or compressed gas, for example, is sealed in the subtank 57. The subtank 57 has a cylindrical shape and it projects from the rear end of the adjuster 56 so as to be inclined upwardly toward the rear end of the vehicle with respect to the axis C. A lower adjuster 58 for adjusting a contraction damping force of the shock absorber 14 is integrally provided at the lower connecting portion 55.

A rear fender 59 is mounted on an upper portion of the swing arm 13 at a position on the rear side of the upper mount 40. The rear fender 59 extends obliquely upwardly towards the rear end of the vehicle so as to cover the upper side of a front portion of the rear wheel 12.

The swing arm suspension 10 shown in FIG. 2 is in a 1G condition (riding condition) where one occupant (rider or operator) rides on the vehicle. In this condition, the rear axle 16 is at a level slightly lower than the pivot shaft 11. In other words, an arm axis M connecting the center of the pivot shaft 11 and the center of the rear axle 16 as viewed in a side elevation is slightly inclined downwardly to the rear end. The shock absorber 14 is arranged so that the axis C of the shock absorber 14 is substantially perpendicular to the arm axis M.

Figure 3:
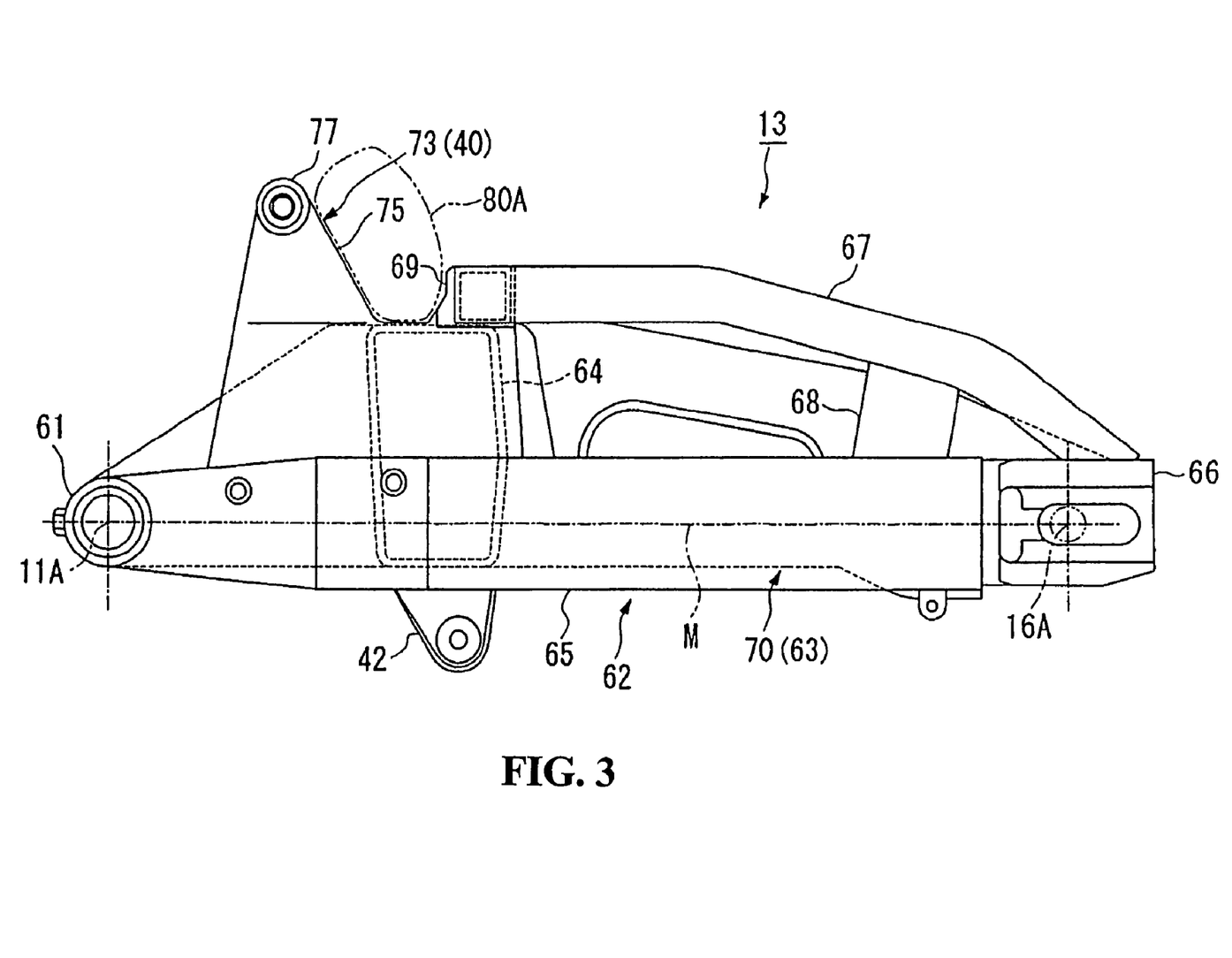
FIG. 3 is a left side view of a swing arm.
Figure 4:
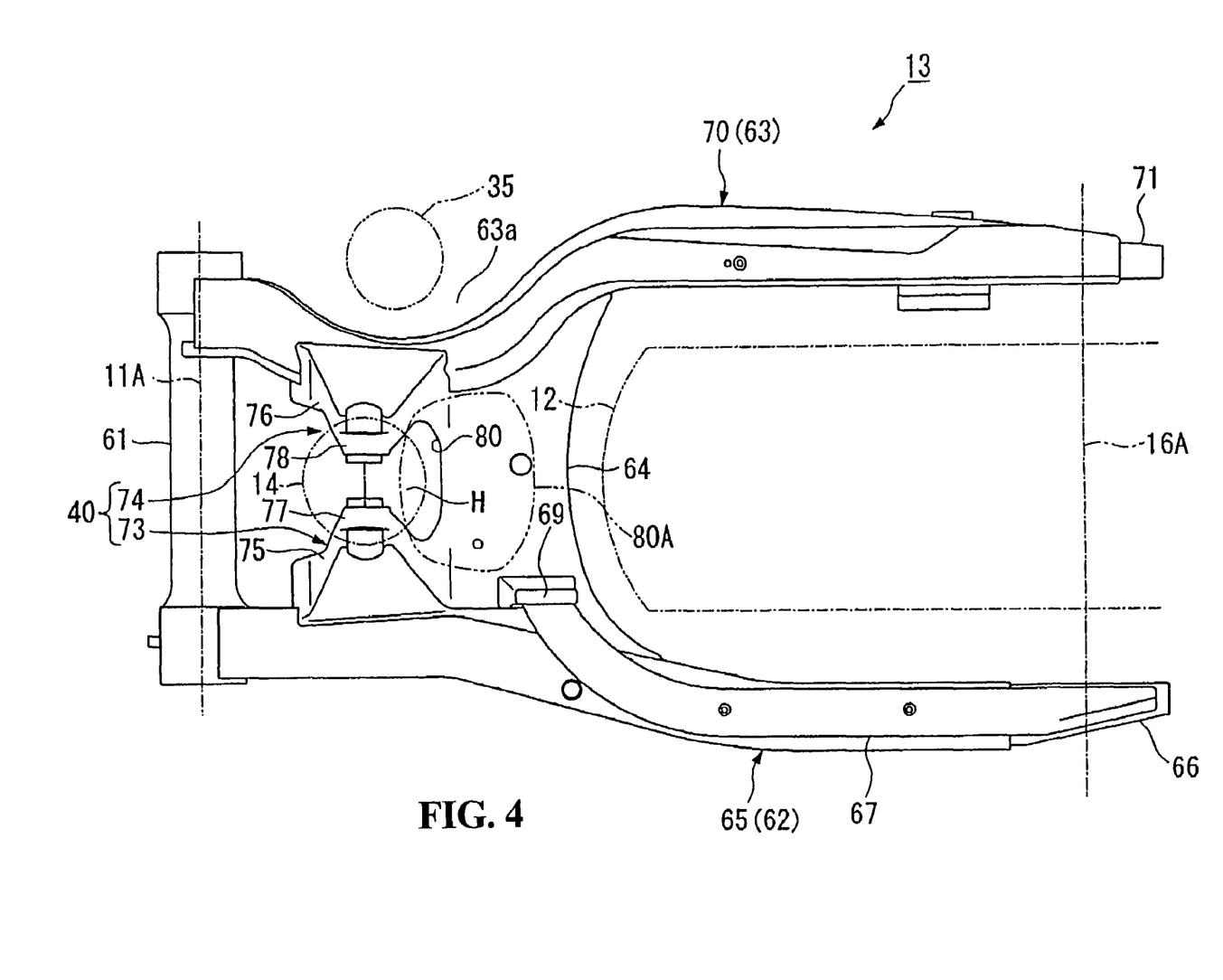
FIG. 4 is a top plan view of the swing arm.

As shown in FIGS. 3 and 4, the swing arm 13 includes a pivot pipe 61 rotatably supported through a needle bearing or the like to the pivot shaft 11, a pair of left and right arm portions 62 and 63 joined at their front ends to the opposite end portions of the pivot pipe 61 on their rear side and a cross member 64 connecting the arm portions 62 and 63 at a position between the shock absorber 14 and the rear wheel 12. The rear wheel 12 is disposed between the arm portions 62 and 63 at their rear half portions, so that the space between the rear half portions of the arm portions 62 and 63 is set wider than that between the front half portions of the arm portions 62 and 63 where the base end portion of the swing arm 13 (on the pivot pipe 61 side) is formed. Further, the right arm portion 63 is formed with a laterally inward curved recess 63a at a position near the pivot pipe 61, so as to avoid the interference with the exhaust pipe 35A passing the laterally outside area of the right arm portion 63. In FIGS. 3 and 4, reference numeral 16A denotes an axis of the rear axle 16, and reference numeral 11A denotes an axis of the pivot shaft 11.

The left arm portion 62 has a left arm body 65 extending along the arm axis M and formed from an aluminum extruded material, a left end piece 66 joined to the rear end of the left arm body 65 for supporting the rear axle 16, a subpipe 67 connected between the left end piece 66 and an upper portion of the cross member 64, and a rear stay 68 for connecting a rear portion of the subpipe 67 and a rear portion of the left arm body 65. The upper portion of the cross member 64 projects upwardly from the upper surface of the left arm body 65 and a connection wall 69 for connecting the front end of the subpipe 67 is vertically provided on the upper surface of the cross member 64 at a left rear portion thereof. In other words, the front end of the subpipe 67 is at a level higher than the upper surface of the cross member 64. The subpipe 67 extends obliquely rearwardly from the left side surface of the connection wall 69 so as to be curved to lie over the left arm body 65 as viewed in a plan view. As viewed in a side elevation, the subpipe 67 extends rearwardly from the connection wall 69 in a substantially parallel relationship with the left arm body 65 and is next bent obliquely downwardly to come into abutment against the upper surface of the left end piece 66. Thus, the rear end of the subpipe 67 is joined to the upper surface of the left end piece 66.

Figure 5:
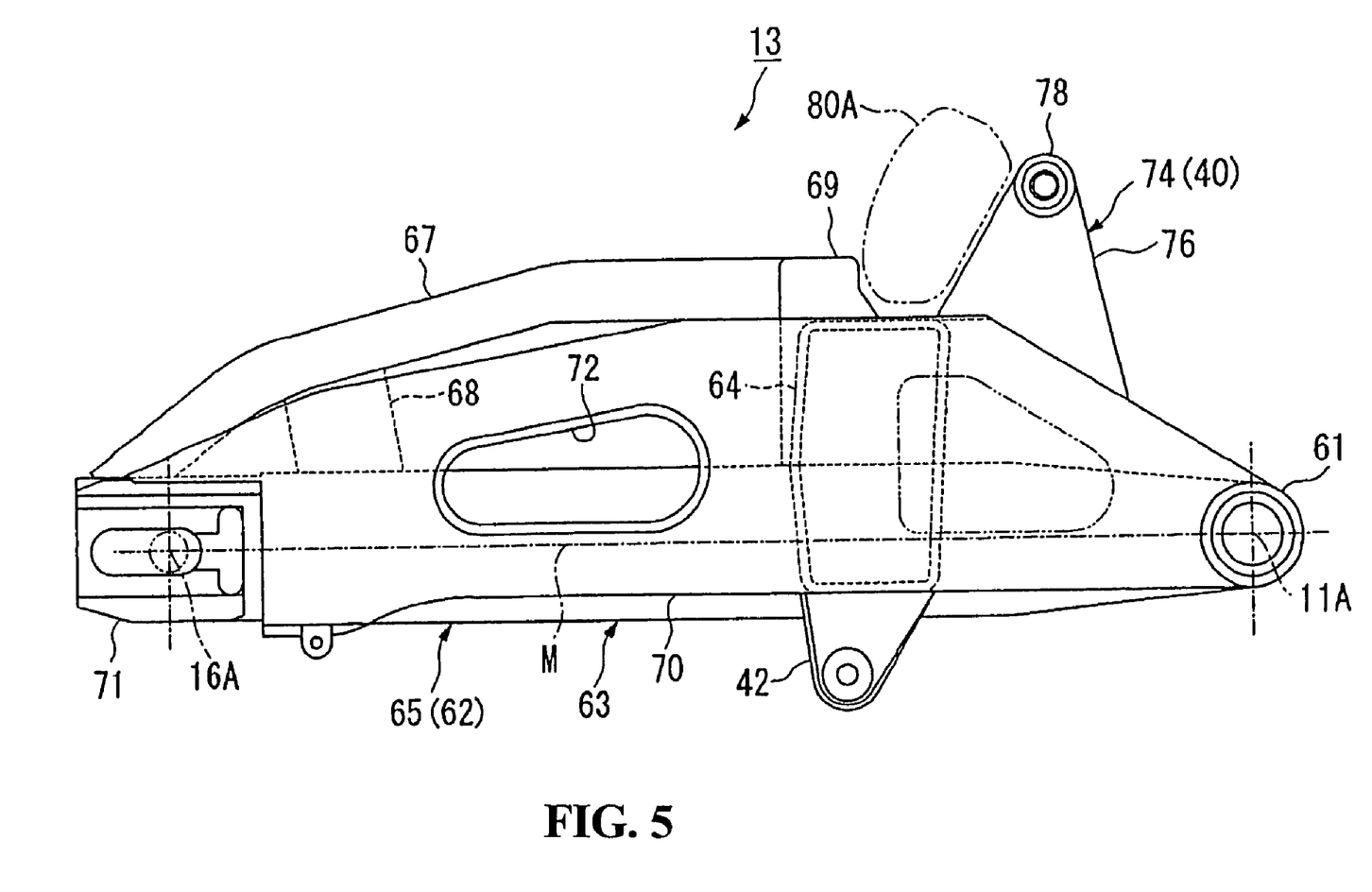
FIG. 5 is a right side view of the swing arm.

Referring to FIG. 5, the right arm portion 63 has a right arm body 70 formed by pressing an aluminum plate and a right end piece 71 joined to the rear end of the right arm body 70 for supporting the rear axle 16. The right end piece 71 is symmetrical with the left end piece 66 like a mirror image. The right arm body 70 is wider than the left arm body 65 so that the upper surface of the right arm body 70 is substantially flush with the upper surface of the cross member 64. Further, a through hole 72 is formed at an arbitrary position in the right arm body 70 to adjust a rigidity balance in the whole of the swing arm 13.

The cross member 64 is an aluminum cast member and it has a substantially vertically elongated rectangular cross section. The cross member 64 is connected between the two arm portions 62 and 63 (see FIGS. 3 and 5). As shown in FIG. 4, the rear end of the cross member 64 is curved as viewed in a plan view so as to follow the shape of the outer circumference of the rear wheel 12. The front end portion of the cross member 64 extends at its laterally opposite positions near the left and right arm portions 62 and 63 toward the pivot pipe 61 so as to follow the laterally inside surfaces of the arm portions 62 and 63. Such left and right extended portions of the cross member 64 are integrally formed at their upper portions with a left mount member 73 and a right mount member 74. The left and right mount members 73 and 74 form a pair to configure the upper mount 40.

Figure 6:
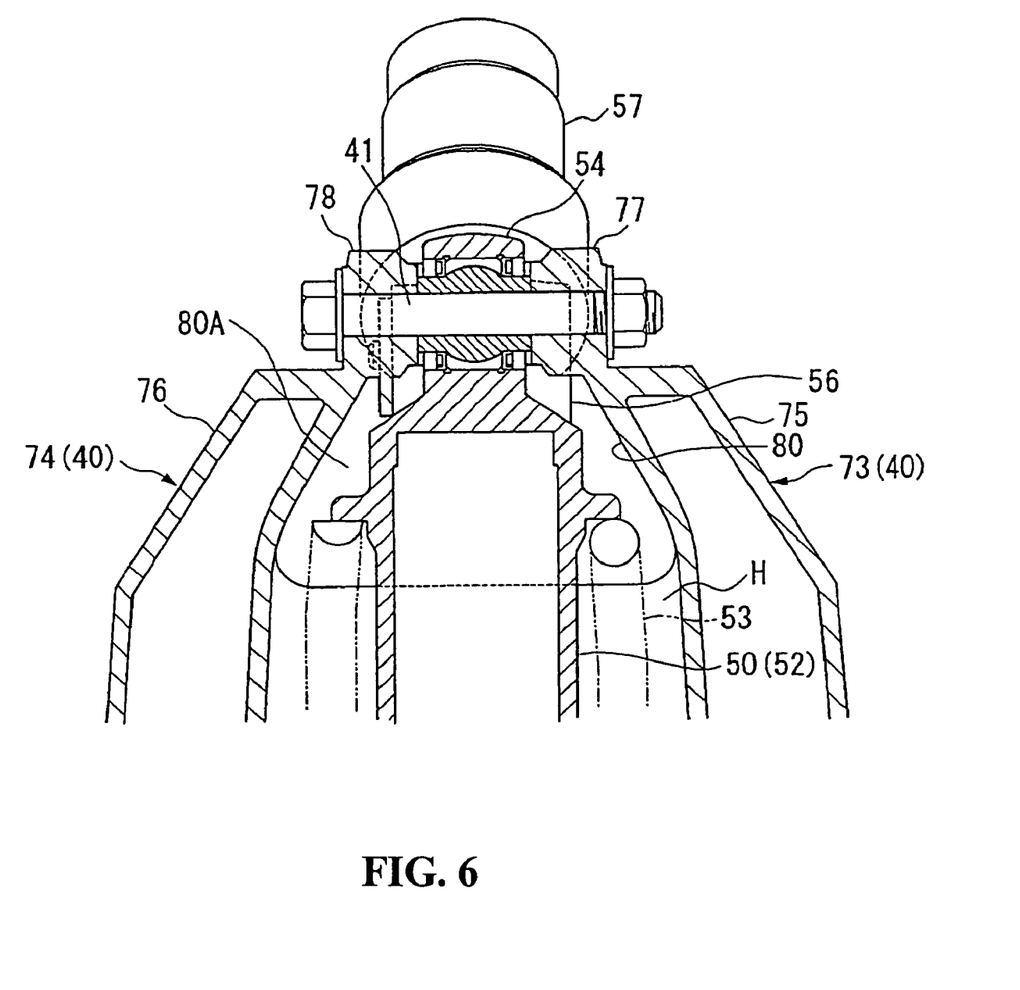
FIG. 6 is a cross section taken along the line 6-6 in FIG. 2.

As shown in FIGS. 3 and 5, the left and right mount members 73 and 74, respectively, have left and right base portions 75 and 76 each having a substantially angular shape projecting upwardly as viewed in a side elevation and left and right boss portions 77 and 78 formed at the tops of the base portions 75 and 76 for allowing the insertion of the first connecting shaft 41. As shown in FIGS. 4 and 6, the base portions 75 and 76 are inclined laterally inwardly to their tops and the upper connecting portion 54 of the shock absorber 14 is disposed between the opposed boss portions 77 and 78. The region surrounded by the pivot pipe 61, the front portions of the left and right arm portions 62 and 63 and the cross member 64 is formed as a shocker absorber arrangement space H for the arrangement of the shock absorber 14. The upper mount 40 including the mount members 73 and 74 is formed so as to cover the upper side of the shocker absorber arrangement space H.

The rear portion of the upper mount 40 is formed with an opening 80 surrounded by the rear edges of the base portions 75 and 76 and the front edge of the upper portion of the cross member 64. This opening 80 provides a communication between the shock absorber arrangement space H of the swing arm 13 and an upper space K formed above the swing arm 13 between the rear fender 59 and the seat frame 9 as viewed in side elevation (see FIG. 2). An exposing portion 80A for exposing the shocker absorber arrangement space H to the upper side of the swing arm 13, a position just over the cross member 64, is provided on the rear side of the upper mount 40 in the longitudinal range defined between the rear portion of the upper mount 40 and the front end portion of the subpipe 67 and in the lateral range defined between the front portion of the left arm portion 62 and the front portion of the right arm portion 63. The adjuster 56 is located in the exposing portion 80A and the subtank 57 connected thereto is located so as to project through the exposing portion 80A into the upper space K. In other words, the exposing portion 80A for locating or passing the adjuster 56 and the subtank 57 is ensured behind the upper mount 40.

As shown in FIG. 6, the lateral width of the adjuster 56 provided at the upper end portion of the shock absorber 14 is substantially the same as the outer diameter of the cylinder 50 of the damper 52 and the outer diameter of the subtank 57 is also substantially the same as the outer diameter of the cylinder 50. Further, the lateral width of the adjuster 56 and the outer diameter of the subtank 57 are larger than the lateral width of the upper connecting portion 54. The adjuster 56 and the subtank 57 are connected together in tandem on the rear side of the upper end portion of the cylinder 50 and are located in the exposing portion 80A provided behind the upper mount 40 through the opening 80, or located in the upper space K so as to pass the opening 80. see FIG. 2. Referring also to FIG. 4, the opening 80 is formed in the rear wall of the upper mount 40, which rear wall is inclined frontwardly to the upper side. Accordingly, the lateral width of the opening 80 is set larger at the rear lower position. With this configuration, the clearance between the swing arm 13 and the shock absorber 14 in the operation of the swing arm suspension 10 can be easily ensured.

According to the above preferred embodiment, the swing arm suspension 10 has such a structure wherein the pivot plate 8 is provided with the pivot shaft 11, the swing arm 13 includes a rear end portion supporting the rear wheel 12 that is swingably mounted at a front end portion to the pivot shaft 11 and the shock absorber 14 is mounted at an upper end portion to the swing arm 13 and connected at a lower end portion through the link mechanism 15 to a portion of the pivot plate 8 that is lower in level relative to the pivot shaft 11. In this swing arm suspension 10, the upper portion of the swing arm 13 is provided with the exposing portion 80A for exposing the shock absorber arrangement space H to the upper space K above the swing arm 13 and the adjuster 56 as a functional component of the shock absorber 14 is located in the exposing portion 80A. Further, the subtank 57 as another functional component of the shock absorber 14 is located in the upper space K. With this arrangement, no shocker absorber load is input to a portion of the pivot plate 8 (vehicle body) above the pivot shaft 11. Furthermore, the exhaust pipe 35A and other components such as a battery can be collectively arranged, so that the cornering performance of the motorcycle 1 can be improved. Further, the adjuster located in the exposing portion 80A or the subtank located in the upper space K can be formed integrally with the shock absorber 14. In this case, the number of parts can be reduced as compared with the case wherein the adjuster and the subtank are separate components to be fixed to the shock absorber. Accordingly, the swing arm suspension 10 can be easily assembled and the weight and cost can also be reduced.

The functional component of the shock absorber 14 projects from the upper portion of the shock absorber 14. With this configuration, any existing shock absorber can be used. In the case wherein the functional component of the shock absorber 14 projects into the upper space K above the swing arm 13, the space behind the upper mount 40 projecting upwardly from the upper portion of the swing arm 13 can be effectively utilized to rationalize the body design.

Further, the upper mount 40 for mounting the upper connecting portion 54 of the shock absorber 14 is formed integrally with the upper portion of the swing arm 13 and the exposing portion 80A is formed behind the upper mount 40. Accordingly, as compared with the case where the upper mount 40 is a separate member to be fixed to the swing arm 13, there is no need for using any fastening parts such as bolts for fastening the upper mount 40 to the swing arm 13 and for providing any fastening portions. As a result, the number of parts can be reduced, and the swing arm suspension 10 can be easily assembled. Further, the weight and cost can also be reduced.

In addition, the exposing portion 80A for locating or passing the adjuster 56 and the subtank 57 is ensured behind the upper mount 40. Accordingly, this configuration is suitable especially in the motorcycle 1 having such a configuration that the exhaust pipe 35A extends from the lower side of the swing arm 13 towards the silencer 37 located above the swing arm 13.

The present invention is not limited to the above preferred embodiment. For example, only one of the adjuster 56 and the subtank 57 may be provided on the shock absorber 14. The subtank 57 may also be located in the exposing portion 80A. The rear portion of the engine 18 may be provided with a pivot shaft and a link mounting portion and the swing arm 13 and the link mechanism 15 may be mounted on this pivot shaft and this link mounting portion, respectively. Further, the swing arm 13 and the link mechanism 15 may be mounted on at least one of the body frame 5 (pivot plate 8) and the engine 18. In this case, the pivot plate 8 may be a separate member to be fixed to the body frame 5. It should be noted that the configuration of the above preferred embodiment is merely illustrative and that various modifications may be made without departing from the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swing arm suspension for a vehicle body comprising:
    a pivot shaft;
    a swing arm having a rear end portion supporting a wheel, said swing arm being swingably mounted at a front end portion to said pivot shaft;
    a shock absorber mounted at an upper end portion to said swing arm and connected at a lower end portion though a link mechanism to a portion of said vehicle body lower in level relative to said pivot shaft;
    wherein an upper portion of said swing arm is provided with an exposing portion for exposing a space for arrangement of said shock absorber to an upper space above said swing arm; and
    at least one of a subtank and an adjuster as functional components of said shock absorber is located in said exposing portion,
    wherein the subtank has a cylindrical shape and it projects from a rear end of the adjuster so as to be inclined upwardly toward a rear end of the vehicle body with respect to an axis C of the shock absorber.

2. The swing arm suspension according to claim 1, wherein an upper mount for mounting the upper end portion of said shock absorber is formed integrally with the upper portion of said swing arm and said exposing portion is formed behind said upper mount.

3. The swing arm suspension according to claim 1, wherein the link mechanism includes a link arm and a link rod extending in substantially a longitudinal direction of said vehicle body.

4. The swing arm suspension according to claim 3, wherein the link arm has a substantially triangular shape as viewed in a side elevation wherein each vertex portion of the link arm functions as a connecting point.

5. The swing arm suspension according to claim 4, wherein an upper end portion of the link arm is connected to the swing arm, a distal end portion of the link rod is pivotably connected to a rear end portion of the link arm and a proximal end portion of the link rod is connected to a vehicle body.

6. The swing arm suspension according to claim 5, wherein the lower end portion of the shock absorber is connected to a front end portion of the link arm.

7. The swing arm suspension according to claim 1, wherein the adjuster enables an adjustment of a damping force of the shock absorber.

8. A swing arm suspension for a vehicle body comprising:
    a pivot shaft;
    a swing arm having a rear end portion supporting a wheel, said swing arm being swingably mounted at a front end portion to said pivot shaft; and
    a shock absorber being mounted at an upper end portion to said swing arm and connected at a lower end portion through a link mechanism to a portion of said vehicle body lower in level relative to said pivot shaft;
    wherein an upper portion of said shock absorber is integrally formed with at least one of a subtank and an adjuster as functional components of said shock absorber, and
    wherein the adjuster projects from the rear side of the upper end portion of the shock absorber so as to be inclined upwardly toward a rear end of the vehicle body with respect to an axis C of the shock absorber.

9. The swing arm suspension according to claim 8, wherein the link mechanism includes a link aim and a link rod extending in substantially a longitudinal direction of a vehicle body.

10. The swing arm suspension according to claim 9, wherein the link arm has a substantially triangular shape as viewed in a side elevation wherein each vertex portion of the link arm functions as a connecting point.

11. The swing arm suspension according to claim 10, wherein an upper end portion of the link arm is connected to the swing arm, a distal end portion of the link rod is pivotably connected to a rear end portion of the link arm and a proximal end portion of the link rod is connected to said vehicle body.

12. The swing arm suspension according to claim 11, wherein the lower end portion of the shock absorber is connected to a front end portion of the link arm.

13. The swing am suspension according to claim 8, wherein the adjuster enables an adjustment of a damping force of the shock absorber.

14. A swing arm suspension adapted to be used with a vehicle body comprising:
    a pivot shaft;
    a swing arm having a rear end portion supporting a wheel, said swing am being swingably mounted at a front end portion to said pivot shaft;
    a shock absorber mounted at an upper end portion to said swing arm and connected at a lower end portion through a link mechanism to a portion of said vehicle body lower in level relative to said pivot shaft; and
    wherein the swing arm includes a cross member integrally formed with a pair of left and right mount members that project upwardly from an upper front end portion thereof,
    the upper end of said shock absorber being mounted an upper portion of said swing arm via a connecting shaft extending between the left and right mount members of the cross member,
    wherein the cross member has a substantially vertically elongated rectangular cross section, and a rear end of the cross member is curved as viewed in plan view so as to follow a shape of an outer circumference of the wheel.

15. The swing arm suspension according to claim 14, wherein the left and fight mount members of the cross member, respectively, include:
    left and right base portions each having a substantially triangular shaped profile when viewed in a side elevation, and
    left and right boss portions formed at the tops of the base portions for allowing insertion of a first connecting shaft supporting the upper end of the shock absorber,
    wherein the base portions are inclined laterally inwardly to their tops, and
    an upper connecting portion of the shock absorber is disposed between the left and right boss portions.

16. The swing arm suspension according to claim 14, wherein the link mechanism includes a link arm and a link rod extending in substantially a longitudinal direction of a vehicle body.

17. The swing arm su4ension according to claim 16, wherein the link arm has a substantially triangular shape as viewed in a side elevation wherein each vertex portion of the link arm functions as a connecting point.

18. The swing arm suspension according to claim 17, wherein an upper end portion of the link arm is connected to the swing arm, a distal end portion of the link rod is pivotably connected to a rear end portion of the link arm and a proximal end portion of the link rod is connected to said vehicle body.

19. The swing arm suspension according claim 16, further comprising a shocker absorber arrangement space H located forward of the vertically elongated rectangular-shaped cross member in which the shock absorber is disposed, wherein the lower end portion of the shock absorber is connected to a front end portion of the link arm.

20. The swing arm suspension according to claim 18, wherein the upper end of the link arm connected to the swing arm is displaced a predetermined distance in a longitudinal direction of a vehicle body relative to the connecting shaft for mounting the upper end of said shock absorber.

* * * * *